(12) United States Patent
Endo et al.

(10) Patent No.: US 12,523,618 B2
(45) Date of Patent: Jan. 13, 2026

(54) INSPECTION SYSTEM

(71) Applicant: TOKYO ELECTRON LIMITED, Tokyo (JP)

(72) Inventors: Tomoya Endo, Yamanashi (JP); Kentaro Konishi, Yamanashi (JP); Yuki Ishida, Yamanashi (JP); Jun Fujihara, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 186 days.

(21) Appl. No.: 18/356,096

(22) Filed: Jul. 20, 2023

(65) Prior Publication Data

US 2024/0044807 A1 Feb. 8, 2024

(30) Foreign Application Priority Data

Aug. 2, 2022 (JP) ................. 2022-123283

(51) Int. Cl.
*G01N 21/95* (2006.01)
*G01N 21/13* (2006.01)
*H01L 21/66* (2006.01)
*G01N 21/01* (2006.01)

(52) U.S. Cl.
CPC ......... *G01N 21/9501* (2013.01); *G01N 21/13* (2013.01); *H01L 22/12* (2013.01); *G01N 2021/0112* (2013.01); *G01N 2201/0227* (2013.01); *G01N 2201/025* (2013.01); *G01N 2201/0461* (2013.01)

(58) Field of Classification Search
CPC .......... G01N 2021/0112; G01N 21/13; G01N 21/9501; G01N 2201/0227; G01N 2201/025; G01N 2201/0461; G01R 31/2831; G01R 31/2867; G01R 31/2868; G01R 31/2879; G01R 31/2893; H01L 21/67259; H01L 21/67742; H01L 22/12; H01L 22/14; H01L 21/67178; H01L 21/6719; H01L 21/67706; H01L 21/68; B23P 19/001; B23P 19/027; B23P 19/06
See application file for complete search history.

(56) References Cited

U.S. PATENT DOCUMENTS 7,701,236 B2 * 4/2010 Akiyama ........... G01R 31/2893
324/750.16
2021/0278456 A1 * 9/2021 Hosaka ............. G01R 31/2889

FOREIGN PATENT DOCUMENTS

| JP | 2017-112387 A | 6/2017 |
| KR | 10-2021-0144212 A | 11/2021 |
| KR | 10-2022-0061525 A | 5/2022 |

* cited by examiner

*Primary Examiner* — Tri T Ton
(74) *Attorney, Agent, or Firm* — Fenwick & West LLP

(57) ABSTRACT

There is an inspection system including multiple inspection units configured to inspect substrates, wherein each of the inspection units includes: a tester configured to inspect a substrate; a moving part configured to hold and move the substrate relative to the tester; and a frame structure configured to accommodate the tester and the moving part, wherein the frame structure of one inspection unit includes: a first frame to be connected to a frame structure of another inspection unit; and a second frame that accommodates at least the moving part and is configured to move relative to the first frame to extract the moving part from the first frame.

9 Claims, 8 Drawing Sheets

INSPECTION SYSTEM

CROSS-REFERENCE TO RELATED APPLICATIONS

This application claims priority to Japanese Patent Application No. 2022-123283, filed on Aug. 2, 2022, the entire contents of which are incorporated herein by reference.

TECHNICAL FIELD

The present disclosure relates to an inspection system.

BACKGROUND

Japanese Laid-open Patent Publication No. 2017-112387 discloses an inspection system including a cell tower having a plurality of cells (inspection units) for inspecting a plurality of substrates (wafers), and a loader for loading and unloading a substrate. This inspection system has a structure in which a test head can be taken out from each inspection unit in order to replace a main board used for inspection.

SUMMARY

The present disclosure provides a technique capable of easily changing the number of inspection units depending on inspection contents and considerably reducing time required for maintenance of the inspection units.

In accordance with an aspect of the present disclosure, there is an inspection system including multiple inspection units configured to inspect substrates, wherein each of the inspection units includes: a tester configured to inspect a substrate; a moving part configured to hold and move the substrate relative to the tester; and a frame structure configured to accommodate the tester and the moving part, wherein the frame structure of one inspection unit includes: a first frame to be connected to a frame structure of another inspection unit; and a second frame that accommodates at least the moving part and is configured to move relative to the first frame to extract the moving part from the first frame.

DETAILED DESCRIPTION

Figure 1:
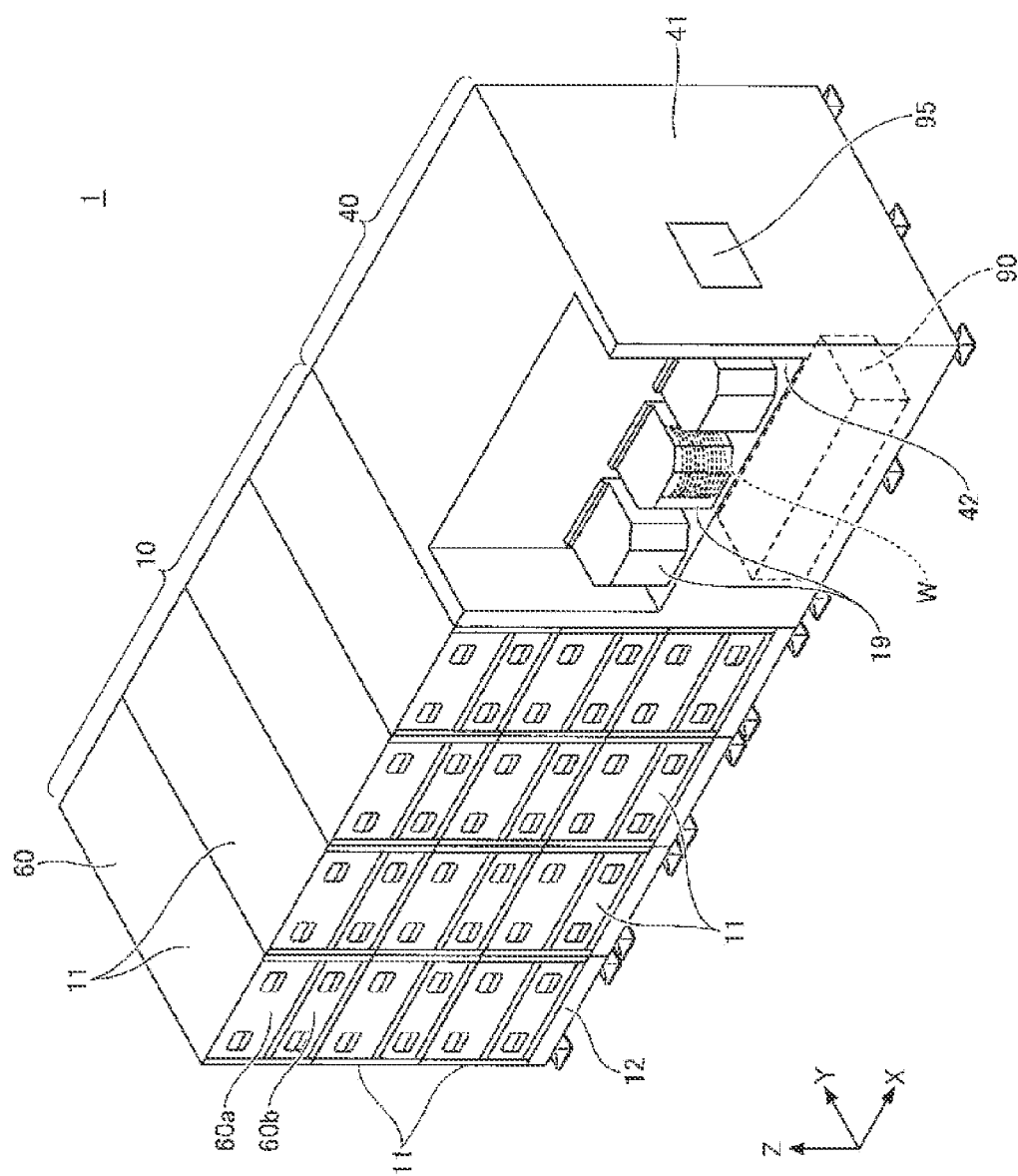
FIG. 1 is a perspective view showing an overall configuration of an inspection system according to one embodiment.

Hereinafter, embodiments of the present disclosure will be described in detail with reference to the accompanying drawings. Like reference numerals will be given to like or corresponding parts throughout the drawings, and redundant description may be omitted.

As shown in FIG. 1, an inspection system 1 according to one embodiment includes a tower 10 capable of inspecting a plurality of wafers W (substrates: see FIG. 2), and a loader 40 for loading and unloading wafers W into and from the tower 10. The inspection system 1 further includes a controller 90 for controlling the entire inspection system 1 in the loader 40. The inspection system 1 is installed, for example, in a clean room of a factory for manufacturing wafers W.

The tower 10 includes a plurality of inspection units (cells) 11 for inspecting wafers W. The tower 10 is formed by assembling the inspection units 11 along the X-axis direction (horizontal direction) and Z-axis direction (height direction) of FIG. 1, and can inspect a plurality of wafers W at the same time. The tower 10 according to the present embodiment includes twelve groups of the inspection units 11 by arranging four inspection units 11 in the X-axis direction and three inspection units 11 in the Z-axis direction arranged in a matrix shape. The number of inspection units 11 of the tower 10 is not particularly limited, and can be arbitrarily set by a user depending on inspection contents, inspection efficiency, and the like. Further, in the inspection system 1 according to the present embodiment, the number of inspection units 11 can be increased (or decreased) depending on the footprint of the factory or the inspection contents. This will be described in detail later.

The loader 40 of the inspection system 1 is installed adjacent to the tower 10 in the positive direction of the X-axis. The loader 40 includes a box-shaped housing 41 having an inner space of which pressure can be reduced to a vacuum atmosphere. The loader 40 has a plurality of load ports 42 for setting FOUPs 19, each capable of accommodating a plurality of wafers W, on the side surface of the housing 41 in the negative direction of the Y-axis.

Figure 2:
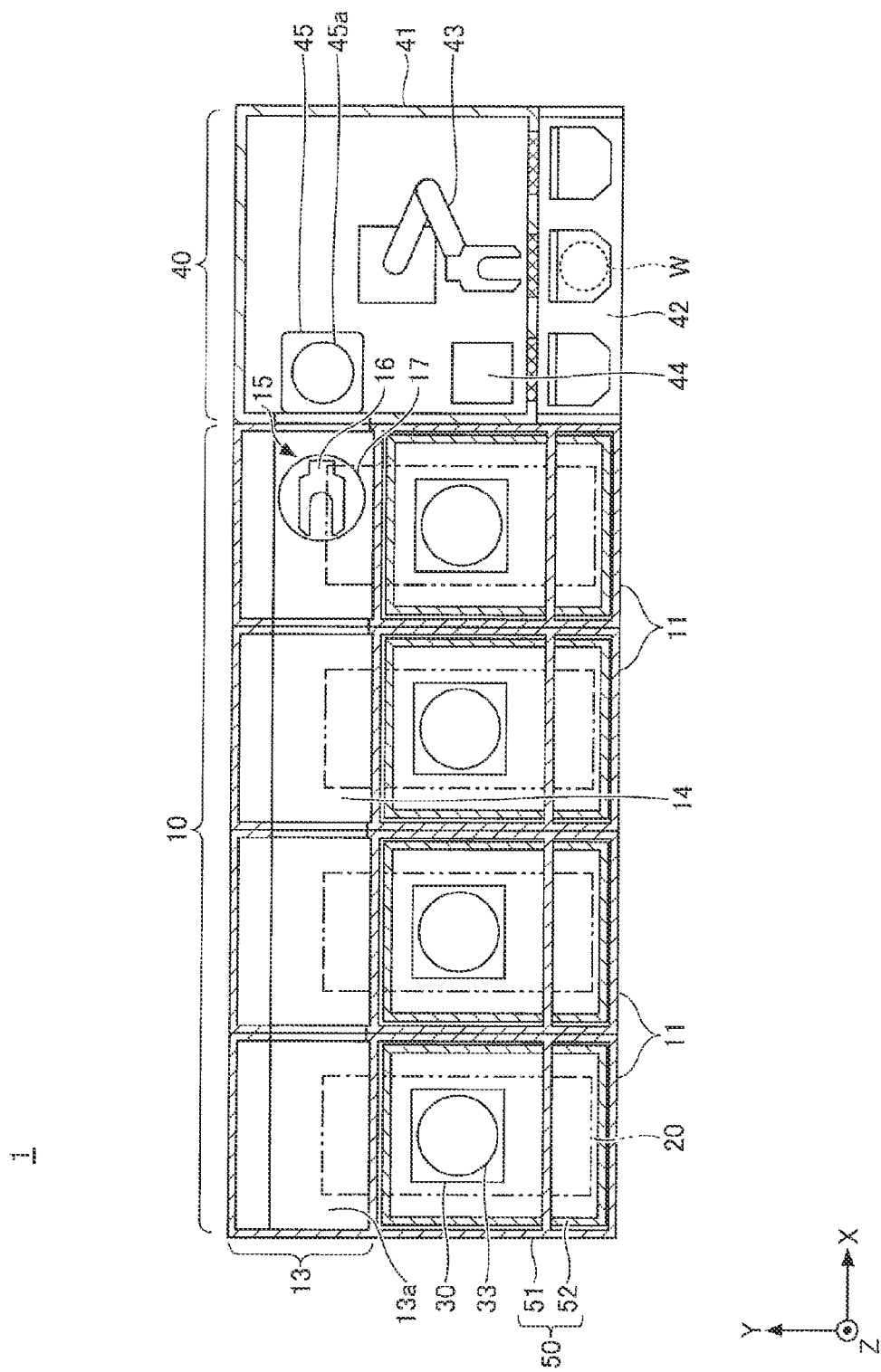
FIG. 2 is a schematic cross-sectional view of the inspection system of FIG. 1 in a direction perpendicular to the Z-axis direction.

As shown in FIG. 2, the housing 41 has therein a transfer robot 43 for transferring a wafer W, an aligner 44 for adjusting the posture of the wafer W before inspection, and an elevator 45 that moves up and down in the housing 41 in the Z-axis direction. In addition, the controller 90 of the inspection system 1 is installed at a lower position or an upper position in the housing 41. A user interface 95 (a touch panel: see FIG. 1, or the like) that is connected to the controller 90 and operated by a user of the inspection system 1 is disposed on the side surface of the housing 41. The loader 40 may include, for example, a transfer device (not shown) for loading and unloading a probe card PR (see FIG. 4) used in each inspection unit 11, in addition to the above components.

The transfer robot 43 in the loader 40 takes out a wafer W before inspection from the FOUP 19 through the load port 42 and transfers the wafer W in the housing 41. For example, in the loader 40, the wafer W before inspection is transferred to the aligner 44 by the transfer robot 43, subjected to circumferential position adjustment in the aligner 44, and transferred to the elevator 45 by the transfer robot 43.

Figure 3:
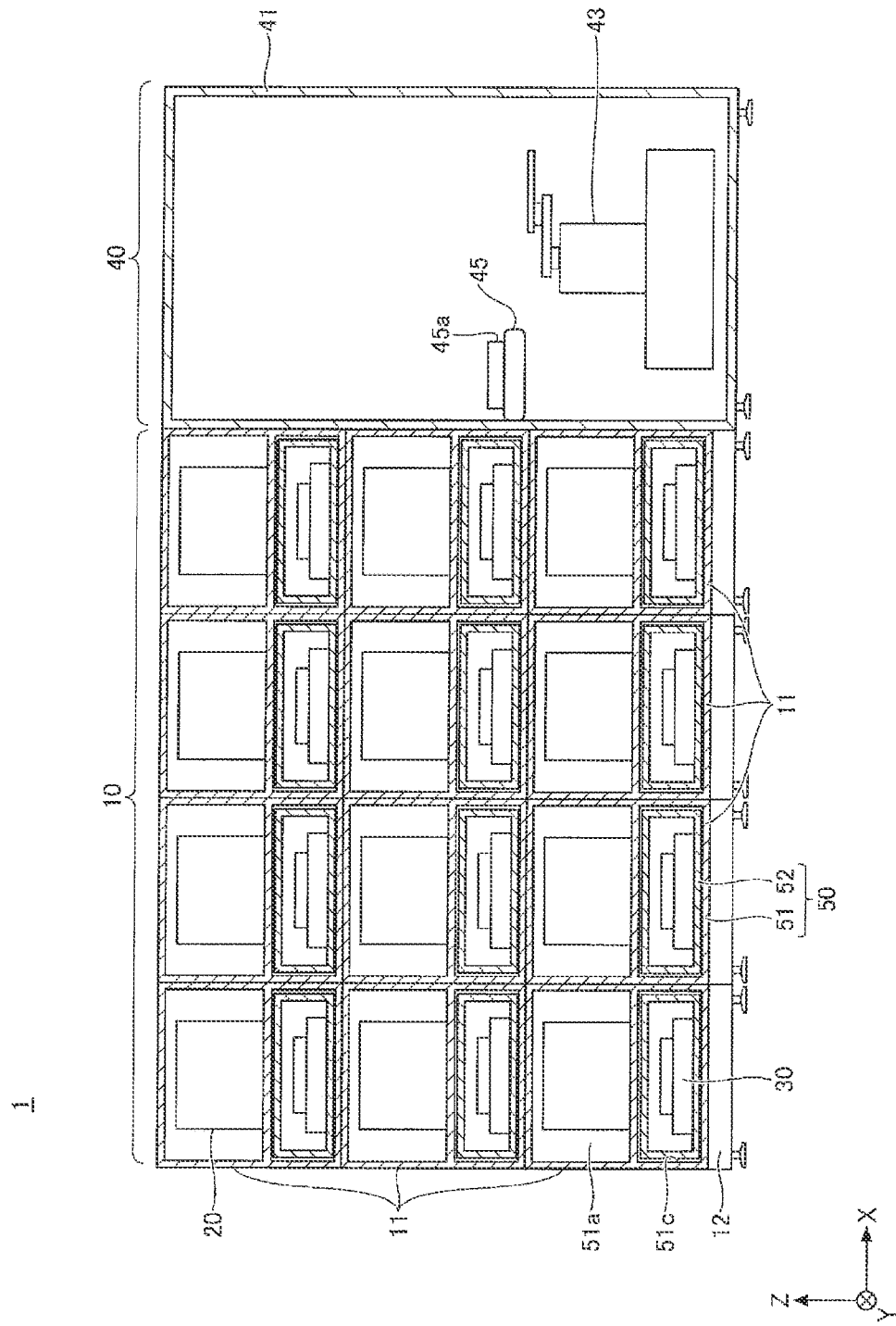
FIG. 3 is a schematic cross-sectional view of the inspection system of FIG. 1 in a direction orthogonal to the Y-axis direction.

As shown in FIG. 3, the elevator 45 is disposed on the side surface of the housing 41 adjacent to the tower 10 (the side surface in the negative direction of the X-axis). The elevator 45 is raised and lowered along the Z-axis direction, and is located at multiple transfer height positions. The multiple transfer height positions are set to correspond to a plurality of transfer parts 13 arranged in the Z-axis direction to transfer the wafer W in the X-axis direction in the tower 10. The inspection system 1 has three transfer units 13 (transfer height positions) because the inspection units 11 are stacked in three stages in the Z-axis direction as described above. The transfer part 13 in each stage in the Z-axis direction includes an arm transfer device 15 that moves the wafer W in the X-axis direction and loads the wafer W into a specified inspection unit 11.

The elevator 45 is provided with a table 45a on which the wafer W can be placed. The elevator 45 receives the wafer W from the transfer robot 43 onto the table 45a at a preset transfer height position, and then moves to the transfer height position specified by the controller 90. Then, the elevator 45 transfers the wafer W to the arm transfer device 15 that has moved in the positive direction of the X-axis of the tower 10 at the specified transfer height position. When the arm transfer device 15 holds an inspected wafer W, the loader 40 receives the inspected wafer W from the arm transfer device 15 onto the table 45a, and the transfer robot 43 holds and transfers the wafer W to the FOUP 19.

Referring back to FIG. 1, the overall framework of the tower 10 of the inspection system 1 is formed by a frame structure 50 of each inspection unit 11. The frame structure 50 holds various components for inspecting the wafer W in the inspection unit 11, and can be connected to other inspection units 11. Each inspection unit 11 has a rectangular parallelepiped cover 60 (see FIG. 1) that is attached to the frame structure 50 and covers substantially the entire inspection unit 11. The components of each inspection unit 11 are not exposed. Alternatively, the inspection system 1 may have a configuration in which the entire tower 10 is covered with a series of tower covers (not shown).

Each inspection unit 11 constituting the lower part of the tower 10 is provided with a base frame 12 capable of holding each inspection unit 11 disposed directly thereabove. The base frame 12 may be provided with an adjustment mechanism (not shown) capable of adjusting the height of each inspection unit 11 disposed directly thereabove. The base frame 12 is not necessarily provided for each inspection unit 11 in the lower stage, and may be continuous over the inspection units 11 in the X-axis direction.

The transfer parts 13 arranged in the Z-axis direction of the tower 10 extend in parallel (in the X-axis direction) on the positive direction side of the Y-axis of the tower 10. Each transfer part 13 has a transfer space 13a that is continuous over the inspection units 11 in the X-axis direction by connecting transfer spaces 51b formed on the positive direction side of the Y-axis of the frame structure 50 of each inspection unit 11. The arm transfer device 15 is movably installed in the transfer space 13a.

Figure 5A:
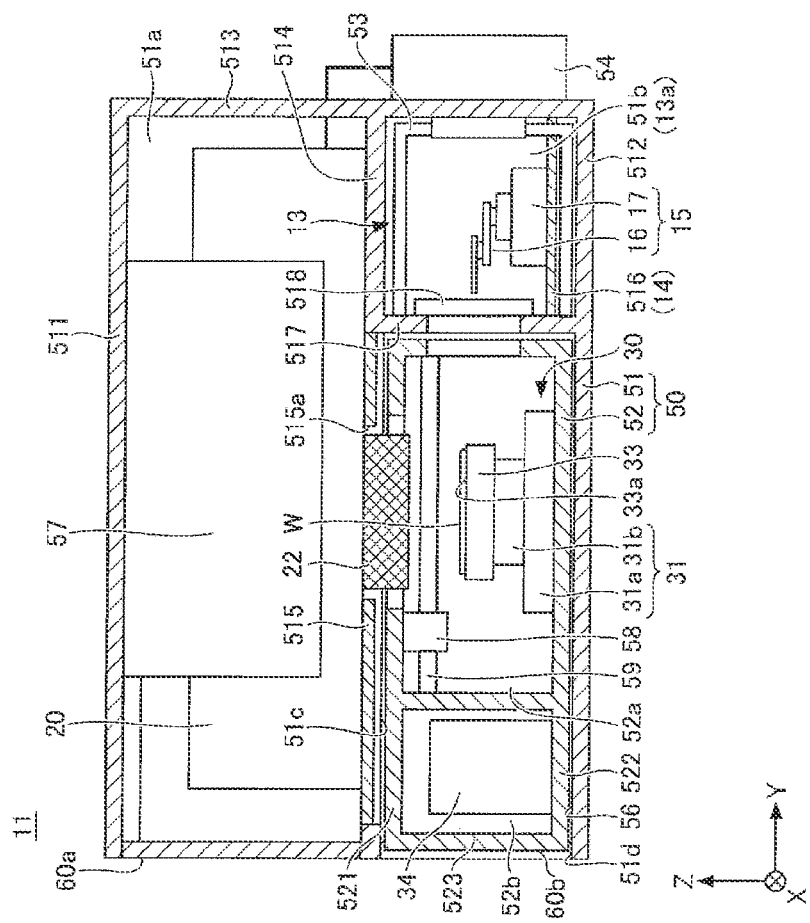
FIG. 5A is a schematic cross-sectional view of the inspection unit in a direction perpendicular to the Y-axis direction.
Figure 5B:
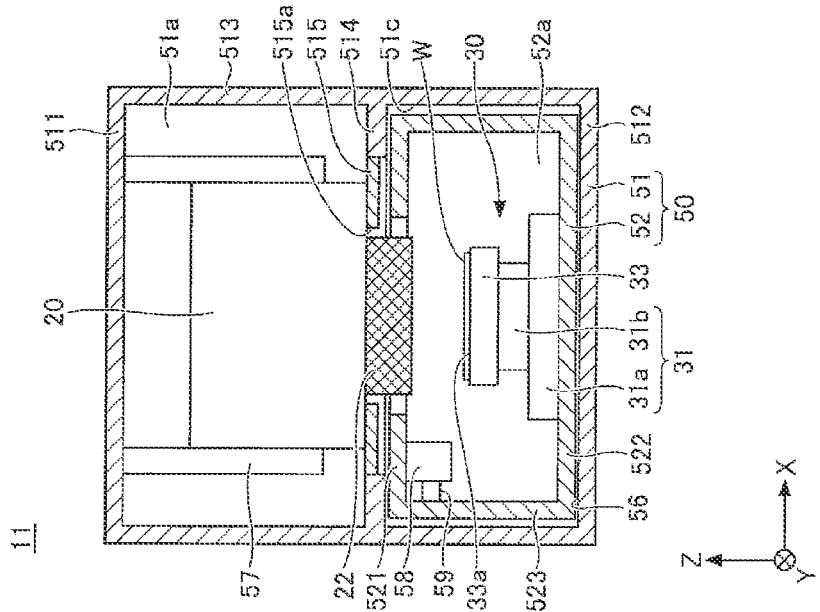
FIG. 5B is a schematic cross-sectional view of the inspection unit in a direction perpendicular to the X-axis direction.

The transfer space 13a has a rectangular parallelepiped shape formed by a cover 60 of each inspection unit 11, a partition wall 517 (see FIG. 5B) installed in the frame structure 50, and a flat floor plate 516 (see FIG. 5B). In the inspection units 11 of the same stage, the floor plates 516 are set to have the same height, thereby forming a transfer path 14 in which the floor plates 516 are horizontally connected in a flat manner. A bridge plate (not shown) may be disposed between the floor plates 516 to eliminate a gap or misalignment between the floor plates 516.

The arm transfer device 15 has an arm portion 16 that holds the wafer W, and a movable body 17 that can self-travel on the transfer path 14 with the arm portion 16 placed thereon. The movable body 17 reciprocates on the transfer path 14 under the control of the controller 90.

The arm portion 16 receives and/or delivers the wafer W with respect to the elevator 45 (table 45a) of the loader 40 at a position adjacent to the elevator 45 (on the positive side of the X-axis). Since the transfer path 14 extends in a flat manner along the X-axis direction as described above, the arm portion 16 can hold the wafer W without the positional displacement of the wafer W at the time of moving on the transfer path 14 by the movable body 17. When the movable body 17 moves to the inspection unit 11 specified by the controller 90, the arm portion 16 receives and/or delivers the wafer W with respect to a moving part 30 of the inspection unit 11.

Figure 4:
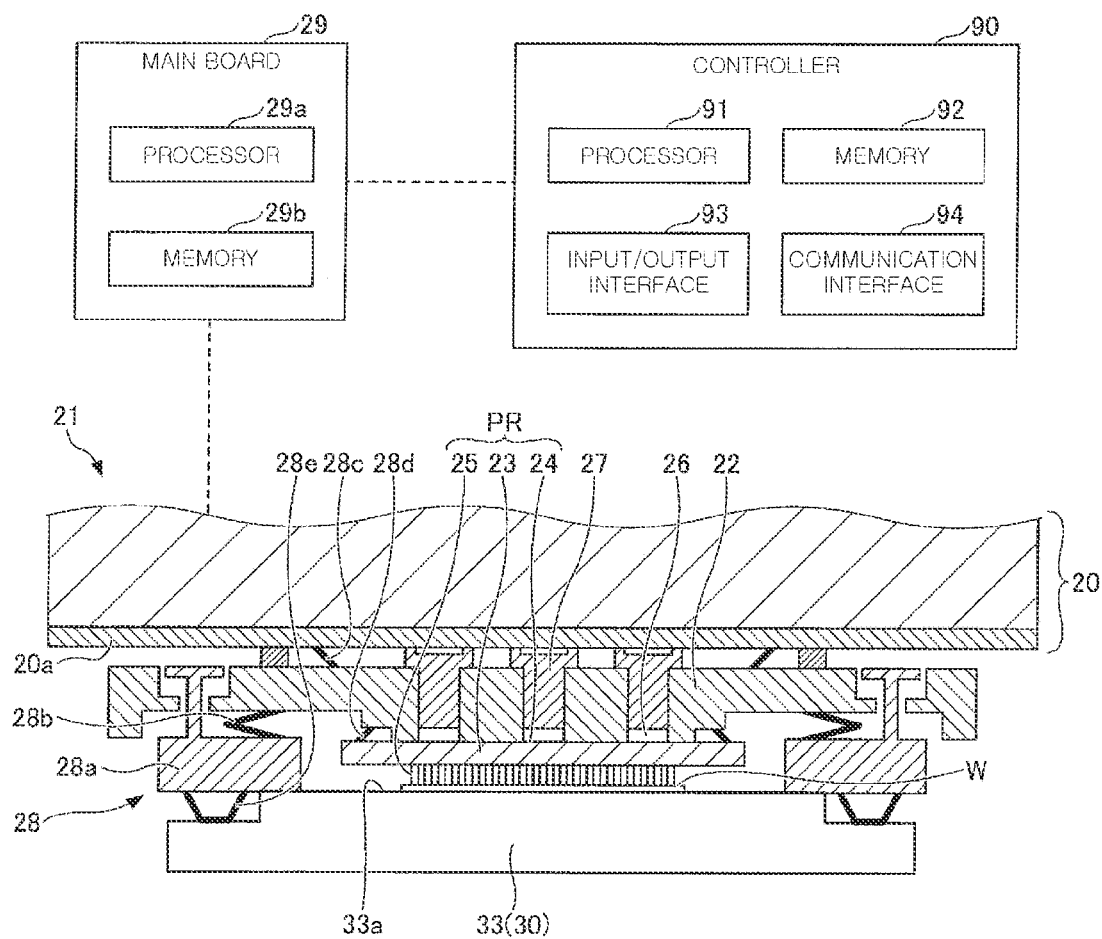
FIG. 4 is an enlarged schematic cross-sectional view showing one aspect of a contact portion between a tester and a substrate.

Each inspection unit 11 of the tower 10 includes a tester 20 for performing actual electrical inspection of the wafer W, and the moving part 30 (stage) for supporting and transferring the wafer W in the inspection unit 11. As shown in FIG. 4, the tester 20 includes a main part 21 having a test head and configured to perform electrical inspection of the wafer W, and a pogo frame 22 (tester-side interface) connected to the main part 21 through a base plate and to which a probe card PR is attached.

The probe card PR has a disc-shaped main body 23, multiple electrodes 24 arranged on the upper surface of the main body 23, and multiple contact probes 25 (contact terminals) respectively connected to the electrodes 24 and projecting downward from the bottom surface of the main body 23. The contact probes 25 are brought into electrical contact with solder bumps or electrode pads of semiconductor devices formed on the wafer W by the contact with the wafer W. The contact probes 25 are brought into simultaneous contact with the entire surface of the wafer W, for example, so that electrical characteristics of multiple semiconductor devices can be inspected at the same time.

The pogo frame 22 is formed in a substantially flat plate shape, and has a plurality of through-holes 26 near the center thereof. A pogo block 27 including multiple pogo pins is inserted into each through-hole 26. The pogo block 27 is connected to an inspection circuit of a main board 29 of the main part 21, and can be in contact with the electrodes 24 of the probe card PR.

The pogo frame 22 also has a vacuum mechanism 28 that creates a vacuum between the pogo frame 22 and the transfer stage 18. The vacuum mechanism 28 includes a flange 28a that is vertically movably engaged with the pogo frame 22, a bellows 28b disposed between the pogo frame 22 and the flange 28a, a seal member 28c disposed between the pogo frame 22 and the base 20a, and a seal member 28d disposed between the pogo frame 22 and the probe card PR. A contact member 28e that can be in airtight contact with the moving part 30 is disposed on the bottom surface of the flange 28a. The vacuum mechanism 28 evacuates the space surrounded by the seal member 28c using a vacuum pump (not shown), so that the base 20a and the pogo frame 22 are attached, and the moving part 30, the probe card PR, and the pogo frame 22 are attached. The inspection unit 11 does not necessarily have a configuration in which the moving part 30 and the probe card PR are sucked, and may have a configuration in which the wafer W is brought into contact with the contact probes 25 of the probe card PR by moving the moving part 30, for example.

The test head of each main part 21 has therein the main board 29 for inspecting a wafer W. The main board 29 includes one or more processors 29a, a memory 29b, and an input/output interface and an electronic circuit (both not shown). The processor 29a performs electrical inspection of the wafer W by operating the individual components based on a control instruction transmitted from the controller 90, and transmits the inspection result to the controller 90.

On the other hand, as shown in FIGS. 5A and 5B, the moving part 30 of the inspection unit 11 has a function of moving the wafer W below the pogo frame 22 of the tester 20. The moving part 30 includes a moving mechanism 31 capable of transferring the wafer W in four axial directions (the X-axis direction, the Y-axis direction, the Z-axis direction, and the θ-axis direction) in the inspection unit 11, and a placing table 33 placed on the moving mechanism 31. The moving mechanism 31 according to the present embodiment includes a plane moving part 31a capable of moving in the X-axis direction and the Y-axis direction and rotating around the θ-axis, and an elevation moving part 31b placed on the plane moving part 31a and capable of moving in the Z-axis direction. Further, the moving part 30 includes a stage controller 34 that operates the plane moving part 31a and the elevation moving part 31b. The moving direction of the wafer W by the moving mechanism 31 is not limited to four axial directions, and may be, for example, three axial directions.

The plane moving part 31a includes an X-axis rail fixed to the frame structure 50, an X-axis movable body moving on the X-axis rail, a Y-axis rail fixed to the X-axis movable body, a Y-axis movable body moving on the Y-axis rail, and a θ-axis movable body capable of rotating in a θ direction on the Y-axis movable body (all not shown). The plane moving part 31a adjusts the horizontal position of the elevation moving part 31b by supplying a power from the stage controller 34 to each movable body based on the instruction from the controller 90. The plane moving part 31a is not limited to the mechanism having the X-axis movable body, the Y-axis movable body, and the θ-axis movable body. For example, the plane moving part 31a may be a UVW type stage that includes a U-axis driving part, a V-axis driving part, and a W-axis driving part (all not shown) to move the elevation moving part 31b in the X-axis direction and the Y-axis direction and rotating the elevation moving part 31b in the θ direction.

The elevation moving part 31b has, for example, a Z-axis rail fixed on the plane moving part 31a, and a Z-axis movable body moving on the Z-axis rail (both not shown). The elevation moving part 31b adjusts the height position of the placing table 33 in the Z-axis direction by supplying a power from the stage controller 34 to the Z-axis movable body based on the instruction from the controller 90.

The placing table 33 has on an upper surface thereof a placing surface 33a formed in a circular shape in plan view and on which the wafer W can be placed. The placing table 33 is attached to the pogo frame 22 while being sucked by the above-described vacuum mechanism 28. The placing table 33 has a holding device such as a vacuum attraction device, a mechanical chuck, or the like, and functions as a chuck for holding the wafer W. The placing table 33 may include a temperature control mechanism (not shown) for adjusting a temperature of the placing surface 33a, a temperature sensor (not shown) for detecting a temperature of the placing surface 33a, and the like.

The controller 90 of the inspection system 1 is a computer that includes one or more processors 91, a memory 92, an input/output interface 93, and a communication interface 94 to control the entire inspection system 1. One or more processors 91 are combination of one or more of a central processing unit (CPU), a graphics processing unit (GPU), an application specific integrated circuit (ASIC), a field-programmable gate array (FPGA), and a circuit formed of multiple discrete semiconductors, and executes and processes programs stored in the memory 92. The memory 92 includes a nonvolatile memory and a volatile memory (for example, a compact disc, a digital versatile disc (DVD), a hard disk, a flash memory, or the like), and constitutes a storage part of the controller 90.

For example, the controller 90 determines inspection of the wafer W in an appropriate inspection unit 11 among the inspection units 11 of the tower 10. Based on the determination result of the inspection unit 11 for performing the inspection, the arm transfer device 15 moves to a position adjacent to the loader 40 to hold the wafer W in the elevator 45, and then moves to a target inspection unit 11. When the arm transfer device 15 moves to the inspection unit 11, the controller 90 delivers the wafer W to the placing table 33 of the moving part 30. The wafer W is transferred to a position below the probe card PR by the moving part 30, and becomes closer to the probe card PR. When the moving part 30 is brought into contact with the flange 28a, a space surrounded by the probe card PR, the transfer stage 18, the pogo frame 22, and the flange 28a is formed below the probe card PR.

When the main board 29 of the tester 20 receives the control instruction from the controller 90, the vacuum mechanism 28 operates to evacuate the space sealed by the bellows 28b, so that the moving part 30 is held with respect to the pogo frame 22. At this time, the solder bumps or the electrode pads of the semiconductor devices of wafer W are respectively brought into contact with the contact probe 25 of the probe card PR.

Accordingly, the tester 20 causes a current to flow through the electronic circuits of the semiconductor devices on the wafer W through the pogo pins and the contact probes 25 of the probe card PR under the control of the main board 29. Then, the tester 20 can electrically inspect the current returning from the wafer W through the contact probe 25 and the pogo pins in the inspection circuit.

As shown in FIGS. 5A and 5B, the frame structure 50 of each inspection unit 11 according to the present embodiment includes a rectangular parallelepiped outer frame 51 (first frame) and an inner frame 52 (second frame) accommodated in the outer frame 51. In the frame structure 50, the inner frame 52 can move relative to the outer frame 51. Accordingly, in the case of performing maintenance such as inspection, repair, component replacement, or the like of the inspection unit 11 in which an error has occurred (or any inspection unit 11 of a user), an appropriate component of the inspection unit 11 can be smoothly extracted from the tower 10.

The outer frame 51 forms the overall framework of one inspection unit 11, and can be assembled to the frame structure 50 of another inspection unit 11. The outer frame 51 has a plurality of ceiling frames 511 extending in the X-Y axis direction on the ceiling side, a plurality of floor frames 512 extending in the X-Y axis direction on the floor side, and a plurality of column frames 513 extending in the Z-axis direction between the ceiling frames 511 and the floor frames 512. A cover 60 is appropriately attached to the outer sides of the ceiling frames 511, the floor frames 512, and the column frames 513.

The outer frame 51 has a plurality of intermediate frames 514 that extend in the X-Y axis direction and bridge the column frames 513 in the middle of the column frames 513 in the Z-axis direction. In other words, the inner space of the outer frame 51 is horizontally divided by the intermediate frames 514.

The inner space of the outer frame 51 is divided into a tester space 51a, a transfer space 51b, and an inner frame space 51c (second frame space) by the frames in cross-sectional view perpendicular to the Y-axis direction (see FIG. 5B). The tester space 51a accommodates the tester 20, and is formed on the entire upper side in the Z-axis direction of the outer frame 51. The transfer space 51b forms the above-described transfer part 13 (the transfer space 13a) in the inspection unit 11, and is formed on the lower side in the Z-axis direction and on the positive side in the Y-axis direction of the outer frame 51. The inner frame space 51c is a space where the inner frame 52 is movably accommodated, and is formed on the lower side in the Z-axis direction and on the negative side in the Y-axis direction of the outer frame 51. The tester space 51a is set to have a volume greater than that of the inner frame space 51c. The inner frame space 51c is set to have a volume greater than that of the transfer space 51b.

The tester space 51a is surrounded by the ceiling frames 511, the column frames 513, and the intermediate frames 514. The rectangular parallelepiped tester 20 elongated in the Y-axis direction is movably accommodated in the tester space 51a. Each intermediate frame 514 of the outer frame 51 has a head plate 515 that covers the gap between the intermediate frames 514 and supports the bottom side of the tester 20.

The head plate 515 has an opening 515a at a position facing the moving part 30 disposed under the tester 20. The tester space 51a and the inner frame space 51c communicate with each other through the opening 515a. The pogo frame 22, which is a tester-side interface projecting from the bottom side of the tester 20, is inserted and fitted into the opening 515a. Accordingly, the pogo frame 22 and the probe card PR (see FIG. 4) are disposed in the inner frame space 51c.

The outer frame 51 has a tester moving mechanism 57 capable of raising and lowering the tester 20 in the Z-axis direction and moving forward and backward in the Y-axis direction. For example, the tester moving mechanism 57 includes a pair of support bodies (not shown) for supporting both sides of the tester 20 in the X-axis direction, a rail in the Z-axis direction and a rail in the Y-axis direction (both not shown) installed in each support body, a movable body (not shown) capable of moving along the rails, and a driving mechanism (not shown) for applying a driving force to the movable body. The inspection unit 11 raises and lowers the tester 20 in the Z-direction by operating the tester moving mechanism 57 under the instruction of the controller 90. When a user extracts the upper cover 60a that blocks the tester space 51a in a state where the tester 20 is adjacent to the ceiling frame 511, the tester 20 can be exposed from the tower 10.

On the other hand, the transfer space 51b of the outer frame 51 is surrounded by the floor frames 512, the column frames 513, and the intermediate frames 514. The cover 60 is not provided on both sides in the X-axis direction of the outer frame 51 forming the transfer space 51b. The transfer space 51b communicates with the transfer space 51b of the inspection unit 11 adjacent thereto in the X-axis direction, or an opening (not shown) formed at the transfer height position of the loader 40.

The floor plate 516 for moving the arm transfer device 15 is installed at each floor frame 512 forming the transfer space 51b. The floor plate 516 may be provided individually for each inspection unit 11, or may be continuous over the inspection units 11 arranged in the X-axis direction to be shared by the inspection units 11.

Further, the outer frame 51 has a partition wall 517 disposed between the transfer space 51b and the inner frame space 51c. The inspection unit 11 includes a gate valve 518 disposed in the through-hole of the partition wall 517 to switch communication and non-communication between the transfer space 51b and the inner frame space 51c. In the inspection system 1, the wafer W is loaded into and unloaded from the moving part 30 by the arm transfer device 15 when the gate valve 518 is opened, and is inspected in a state where the gate valve 518 closed.

In the transfer space 51b and the stage space 52a to be described later, a temperature control medium line 53 may be disposed near the intermediate frame 514 and the floor frame 512 to circulate a temperature control medium for controlling a temperature of the wafer W placed on the moving part 30. The line 53 of the stage space 52a is flexible and connected to the placing table 33 of the moving part 30. The line 53 of the transfer space 51b extends in the X-axis direction on the side surface of the tower 10 (the outer frame 51), and is connected to a heat exchanger (not shown) provided outside the tower 10. A power supply 54 for supplying a power to the tester 20 is disposed outside the outer frame 51 of the transfer space 51b. Since the power supply 54 is adjacent to the line 53, the temperature is appropriately adjusted by the temperature control medium flowing in the line 53.

On the other hand, the inner frame space 51c is surrounded by the floor frames 512, the column frames 513, and the intermediate frames 514. The inner frame space 51c is formed in a size that allows the inner frame 52 to be accommodated, and has an inlet/outlet 51d through which the inner frame 52 can be detached and inserted in the negative direction of the Y-axis.

Figure 6:
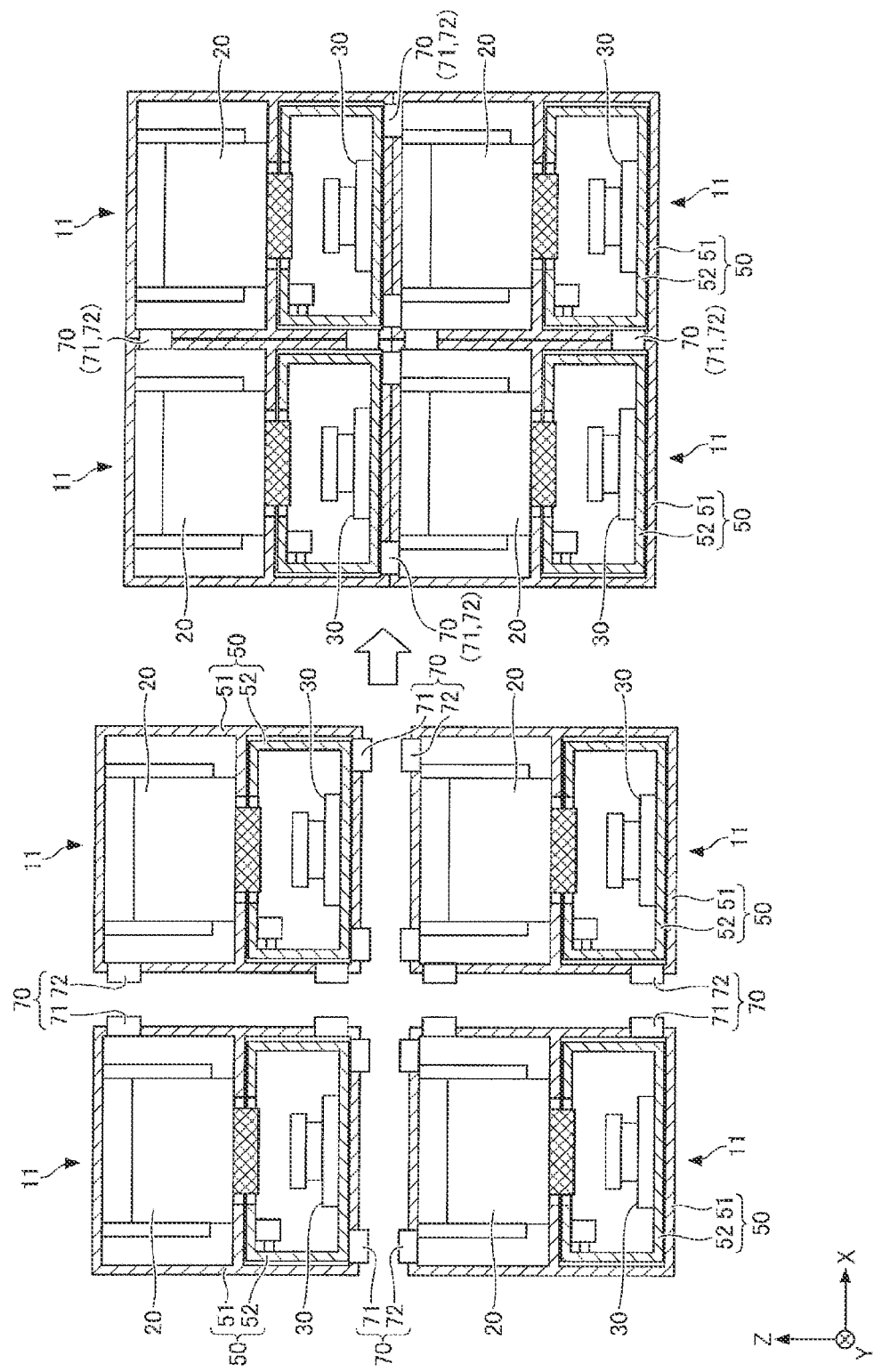
FIG. 6 is an explanatory diagram schematically showing assembly of a plurality of inspection units.

As shown in FIG. 6, the outer frame 51 has a connecting structure 70 provided for the ceiling frames 511, the floor frames 512, and the column frames 513 so as to be connected to the outer frame 51 of another inspection unit 11. The connecting structure 70 includes, for example, an engaging recess 71 formed at an appropriate frame of one inspection unit 11 and an engaging protrusion 72 formed at a frame adjacent to an engaging recess 71 of another inspection unit 11. The connecting structure 70 integrates adjacent inspection units 11 by inserting the engaging protrusion 72 into the engaging recess 71 and engaging them by an engaging method such as insertion fitting or screwing.

In the case of constructing the tower 10, an operator connects the connecting structures 70 of the respective frames while positioning the ceiling frame 511 of the lower inspection unit 11 and the floor frame 512 of the upper inspection unit 11. Accordingly, the inspection units 11 are stacked in the Z-axis direction. For example, the operator sets the number of stages of the inspection units 11 (the height of the tower 10) depending on the height of the loader 40, and stacks the inspection units 11. Further, the operator connects the connecting structures 70 of the respective frames while positioning the inspection units 11 stacked in multiple stages in the Z-axis direction and other inspection units 11 stacked in multiple stages in the Z-axis direction in the X-axis direction. Accordingly, the tower 10 in which the inspection units 11 are connected in a matrix form along the X-axis direction and the Z-axis direction is formed. In FIG. 6, the inspection unit 11 is assembled in a state where the tester 20 and the moving part 30 are disposed in the frame structure 50. However, at least the outer frame 51 may be required to assemble the inspection units 11, and other components of the inspection unit 11 may be installed after the assembly.

As shown in FIGS. 5A and 5B, the inner frame 52 accommodated in the outer frame 51 is formed in a lattice rectangular parallelepiped shape including a plurality of ceiling frames 521, a plurality of floor frames 522, and a plurality of column frames 523. The inner frame 52 has a stage space 52a accommodating the moving part 30 on the positive direction side of the Y-axis, and has a controller space 52b accommodating the stage controller 34 on the negative direction side of the Y-axis. The stage space 52a and the controller space 52b are divided by the column frames 523, but they communicate with each other. Therefore, the moving part 30 and the stage controller 34 can be easily connected in a wired manner.

Each ceiling frame 521 of the inner frame 52 has a gap at a portion facing the opening 515a of the head plate 515. Accordingly, the inspection unit 11 can stably attract the pogo frame 22 projecting from the main part 21 into the inner frame space 51c through the opening 515a before inspection, the probe card PR, the placing table 33, and the wafer W.

The inner frame 52 supports an optical device 58 to be movable at the upper part of the stage space 52a. The optical device 58 may be, for example, a camera capable of imaging the probe card PR, the placing table 33 of the moving part 30, the wafer W, or the like. The inspection unit 11 has an optical system moving mechanism 59 for moving the optical device 58 along the Y-axis direction, and the optical device 58 is disposed at an appropriate position by the optical system moving mechanism 59. The controller 90 acquires the relative positions of the probe card PR and the wafer W and imaging information of the posture from the optical device 58, and controls the movement of the wafer W by the moving part 30 based on the imaging information. Accordingly, the inspection system 1 can accurately locate the wafer W with respect to the tester 20.

The inner frame 52 of the frame structure 50 is accommodated in the inner frame space 51c of the outer frame 51 to be relatively movable in the Y-axis direction. The inner frame 52 can be extracted in the negative direction of the Y-axis through the inlet/outlet 51d of the outer frame 51, and can be pressed in the positive direction of the Y-axis through the inlet/outlet 51d. In the inspection unit 11, the moving part 30 and the stage controller 34 are exposed from the tower 10 by the relative movement of the inner frame 52 with respect to the outer frame 51. The cover 60 that covers the tower 10 has a lower cover 60b that can move integrally with the inner frame 52 on the negative direction side of the Y-axis of the inspection unit 11 in order to extract the inner frame 52. The lower cover 60b is installed at each column frame 523.

In the frame structure 50, the entire inner frame 52 may be detached from the outer frame 51, or may not be detached from the outer frame 51 by setting a movement limit position for the inner frame 52 and restricting the movement of the inner frame 52 at the movement limit position. For example, the configuration that prohibits detachment may have a structure in which an appropriate frame of the inner frame 52 is caught by an appropriate frame of the outer frame 51 at the movement limit position.

The frame structure 50 may include a movement assist mechanism 56 for assisting the movement of the inner frame 52 at a portion where the inner frame 52 is in contact with the outer frame 51. The movement assist mechanism 56 may have, for example, a configuration including a rail and multiple rolling bodies rolling along the rail.

The inspection system 1 according to the present embodiment is basically configured as described above, and the effects thereof will be described below.

The inspection system 1 inspects the wafers W in the inspection units 11 of the tower 10 simultaneously. In order to inspect the wafer W, the transfer robot 43 takes out the wafer W from the FOUP 19 and transfers the wafer W to the elevator 45 under the control of the controller 90 in the loader 40. The controller 90 raises and lowers the elevator 45 to locate the wafer W at the transfer part 13 (transfer height position) on each stage of the tower 10. Then, the controller 90 controls the arm transfer device 15 of the transfer part 13 on each stage to receive the wafer W in the elevator 45. The arm transfer device 15 moves in the X-axis direction to transfer the wafer W to a target inspection unit 11, and delivers the wafer W to the placing table 33 of the moving part 30. When the stage controller 34 receives an instruction from the controller 90, the moving part 30 moves the placing table 33 to a three-dimensional position where the placing table 44 can be attached to the pogo frame 22 of the tester 20. After the movement of the moving part 30, the tester 20 operates the vacuum mechanism 28 to hold the pogo frame 22 and the wafer W, and performs electrical inspection of the wafer W in that state.

The inspection system 1 according to the present embodiment is configured such that the inspection unit 11 can be easily extracted from the tower 10 when the maintenance of the inspection unit 11 is required. Here, the maintenance of the inspection unit 11 includes upper side maintenance such as the replacement of the main board 29 of the main part 21, and lower side maintenance such as the adjustment of the moving part 30 or the inspection.

Figure 7:
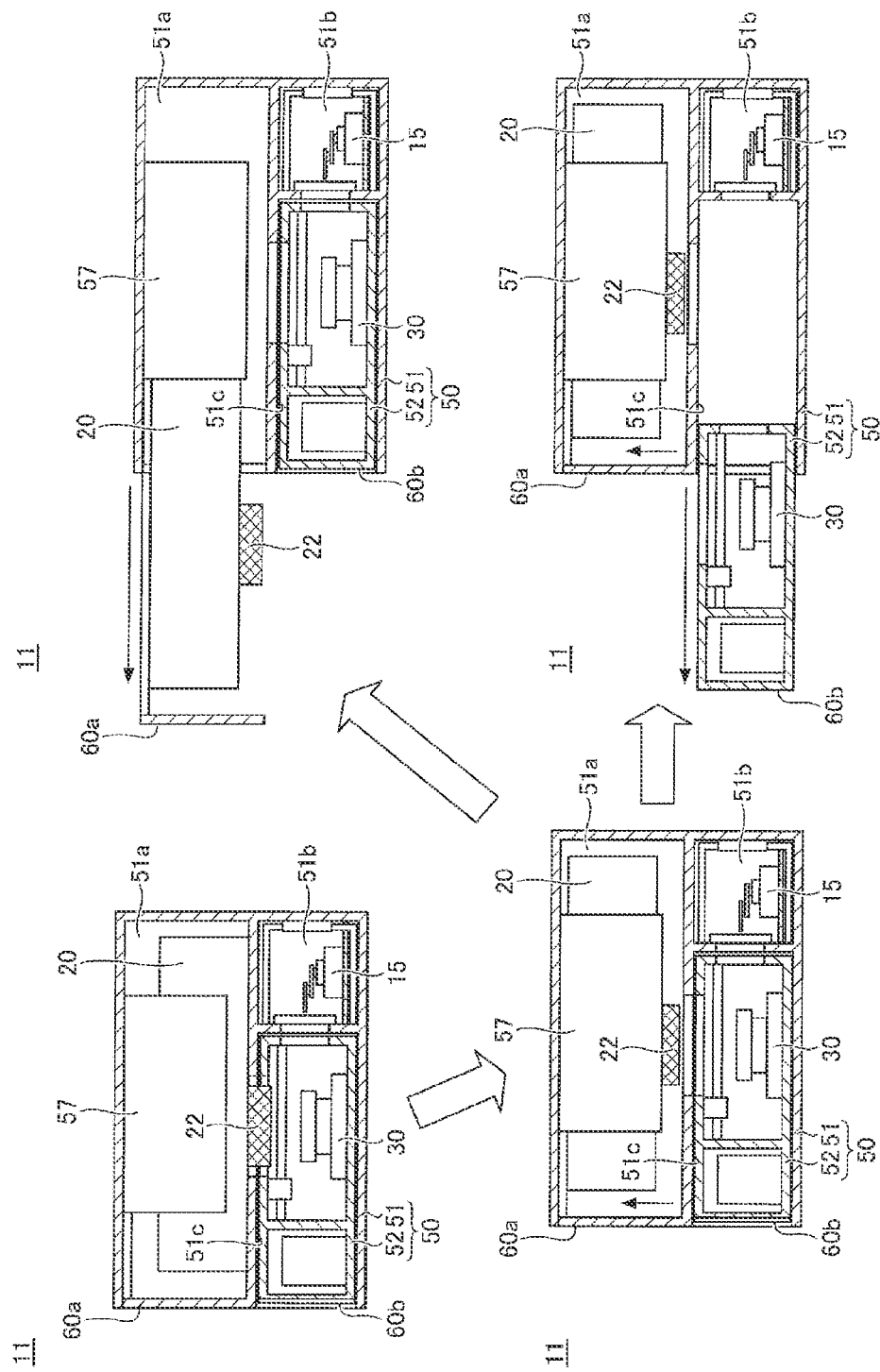
FIG. 7 is an explanatory diagram schematically showing extraction of individual components of the inspection unit.

For example, a user specifies the inspection unit 11 to be subjected to maintenance using the user interface 95. As shown in FIG. 7, the controller 90 sets a state in which the inspection unit 11 specified by the user can be subjected to maintenance. At this time, the controller 90 automatically operates the tester moving mechanism 57 to move the tester 20 placed on the head plate 515 upward in the Z-axis direction, and the main part 21 and the pogo frame 22 projecting from the opening 515a are accommodated in the tester space 51a. Accordingly, in the inspection unit 11, the tester 20 and the moving part 30 are separated vertically (see the lower left part of FIG. 7).

Next, a user extracts the component to be subjected to the maintenance in the inspection unit 11 from the surface on the negative direction side of the Y-axis of the tower 10. In the inspection system 1, the inspection unit 11 that is not subjected to the maintenance may be locked by a locking mechanism (not shown) of the frame structure 50 to prevent the components of the inspection unit 11 from being extracted from the tower 10. For example, the locking mechanism can switch a lock state and an unlock state under the control of the controller 90.

In the case of performing the upper side maintenance of the inspection unit 11, a user pulls the handle of the upper cover 60a in the negative direction of the Y-axis of the tester space 51a (see FIG. 1). Accordingly, the tester 20 (the main part 21, the pogo frame 22, or the like) moves relative to the outer frame 51 and, thus, the tester 20 is extracted from the tower 10 (see the upper right part of FIG. 7). At this time, the tester moving mechanism 57 moves the tester 20 only in the negative direction of the Y-axis while continuously holding the tester 20.

In a state where the tester 20 is extracted, the user performs the maintenance of the tester 20 (the replacement of the main board 29, or the like). After the maintenance of the tester 20, the user can smoothly return the tester 20 to the tester space 51a by pushing the tester 20 in the positive direction of the Y-axis.

On the other hand, in the case of performing the lower side maintenance of the inspection unit 11, a user pulls the handle of the lower cover 60*b* of the inner frame 52 (see FIG. 1). Accordingly, the inner frame 52 moves relative to the outer frame 51 in the negative direction of the Y-axis (see the lower right part of FIG. 7), and is extracted from the tower 10 through the inlet/outlet 51*d*. In the inspection unit 11, the moving part 30 and the stage controller 34 are exposed by the movement of the inner frame 52.

The user can easily perform the maintenance of the exposed moving part 30 or the exposed stage controller 34. After the maintenance, the user can smoothly return the inner frame 52 to the inner frame space 51*c* by pushing the inner frame 52 in the positive direction of the Y-axis.

Figure 8:
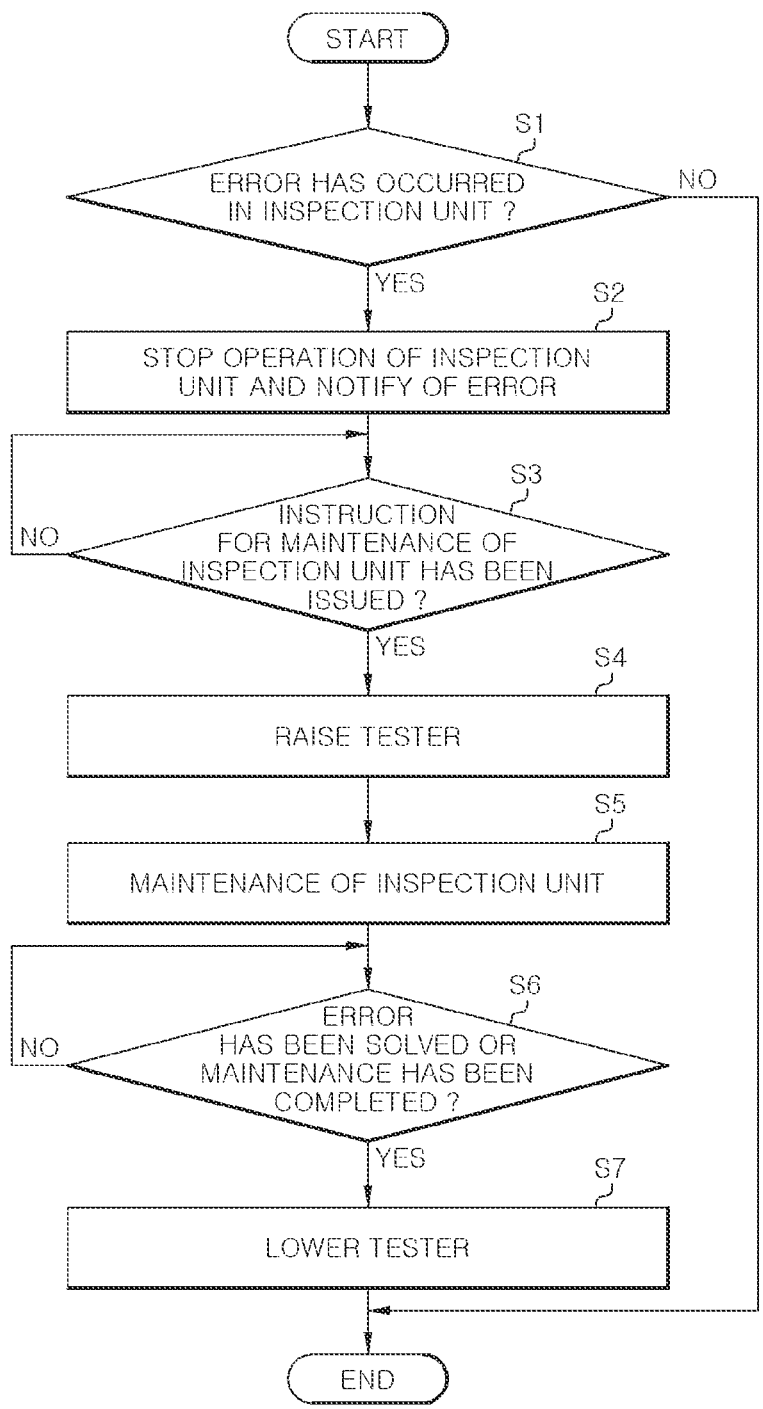
FIG. 8 is a flowchart showing an operation of the inspection system during inspection.

The inspection system 1 can perform the maintenance of the inspection unit 11 not only while the operation of the entire system is being stopped but also while the system is operating (during the inspection of multiple wafers W). Hereinafter, an example of a maintenance process performed during the inspection of multiple wafers W will be described with reference to FIG. 8.

Each inspection unit 11 of the inspection system 1 self-determines whether or not an error (abnormality or failure) has occurred during the system operation. The controller 90 is configured to receive error information from each inspection unit 11, and determines whether or not an error has occurred in each inspection unit 11 during the system operation (step S1). If no error is received in step S1 (step S1: NO), current processing flow is terminated and new processing flow is repeated. On the other hand, if an error is received in step S1 (step S1: YES), the processing proceeds to step S2.

In step S2, the controller 90 stops the operation of the inspection unit 11 in which the error has occurred, and notifies a user of the information on the occurrence of the error in the inspection unit 11 using the user interface 95. At this time, the controller 90 notifies, in addition to the location of the inspection unit 11 in which the error has occurred, a specific error location (the tester 20, the moving part 30, or the like) or contents of the error. Accordingly, the user can easily recognize the inspection unit 11 to be subjected to the maintenance and the maintenance contents. The controller 90 continues the inspection of the wafer W, the transfer of the wafer W, or the like of the wafer W for each inspection unit 11 in which no error has occurred.

Next, the controller 90 determines whether or not the user has issued an operation instruction for performing the maintenance of the inspection unit 11 (step S3). If there is a maintenance instruction for the inspection unit 11 (step S3: YES), the processing proceeds to step S4. If there is no maintenance instruction (step S3: NO), the operation of the corresponding inspection unit 11 is stopped and the error notification is continued.

The controller 90 operates the tester moving mechanism 57 to raise the tester 20 based on the user's maintenance instruction (step S4). Accordingly, the tester 20 or the moving part 30 of the inspection unit 11 can be extracted from the tower 10.

Thereafter, the user extracts the tester 20 or the inner frame 52 from the tower 10 depending on the error location, and performs the maintenance of the error location (step S5). At this time, the controller 90 monitors whether or not the error in the inspection unit 11 has been solved or whether or not the maintenance has been completed (step S6). If the error has been solved or the maintenance has been completed (step S6: YES), the processing proceeds to step S7.

When the tester 20 or the inner frame 52 is pushed and returns into the inspection unit 11, the controller 90 operates the tester moving mechanism 57 to lower the tester 20 (step S7). Accordingly, the inspection unit 11 in which the error has occurred becomes ready to inspect the wafer W, and the inspection system 1 can inspect the wafer W using this inspection unit 11.

As described above, the inspection system 1 can perform the maintenance of the inspection unit 11 in which an error has occurred even during the operation. In particular, in the inspection system 1, the tester 20 or the inner frame 52 can move relative to the outer frame 51 and be easily extracted from the tower 10. Therefore, the time required for the maintenance can be shortened, and the downtime of the inspection unit 11 can be minimized.

Further, the inspection system 1 according to the present embodiment can simply increase/decrease (expand) the number of inspection units 11 in the tower 10 along the X-axis direction and the Z-axis direction even after the factory is installed. For example, a user can perform an operation of adding or removing the inspection unit 11 to or from the tower 10 depending on the inspection contents of the wafer W (time required for inspection, processing capacity, power consumption, or the like), the operational efficiency of the wafer W in the loader 40, and the like.

As described above, each inspection unit 11 has a configuration in which the tester 20 and the moving part 30 are surrounded by the outer frame 51, and the outer frame 51 of one inspection unit 11 can be easily connected to the outer frame 51 of another inspection unit 11 (see also FIG. 6). Therefore, in the case of adding the inspection unit 11, the tower 10 can be simply expanded by connecting the rows of the inspection units 11 arranged in the Z-axis direction along the X-axis direction. At the time of the expansion, a user allows the transfer space 51*b* of the inspection unit 11 to be newly connected and the transfer space 13*a* of the existing tower 10 to communicate with each other along the X-axis direction, and installs the floor plate 516 that allows the arm transfer device 15 to move. Accordingly, in the inspection system 1, the wafer W delivered from the loader 40 to the arm transfer device 15 can be smoothly transferred to the expanded inspection unit 11.

The technical ideas and effects of the present disclosure described in the above embodiments will be described below.

The inspection system 1 according to a first aspect of the present disclosure includes the plurality of inspection units 11 for inspecting a substrate (wafer W). Each of the inspection units 11 includes the tester 20 for inspecting the substrate, the moving part 30 for holding and moving the substrate relative to the tester 20, and the frame structure 50 accommodating the tester 20 and the moving part 30. The frame structure 50 of one inspection unit 11 includes the first frame (the outer frame 51) that can be connected to the frame structure 50 of another inspection unit 11, and the second frame (the inner frame 52) accommodating at least the moving part 30 and from which the moving part 30 can be extracted.

In accordance with the above description, the inspection system 1 includes the first frame (the outer frame 51) and the second frame (the inner frame 52), so that the moving part 30 can be easily exposed from the inspection unit 11 by extracting the second frame. Therefore, a user of the inspection system 1 can extract the second frame of the inspection unit 11 to perform the maintenance of the moving part 30, which makes it possible to considerably reduce the time required for the maintenance (for example, the time during which the operation of the inspection unit 11 is stopped). Further, since the first frame can be connected to the frame structures 50 of another inspection unit 11, the inspection system 1 can easily change the number of inspection units 11 depending on the inspection contents. For example, the inspection system 1 can further improve the inspection efficiency by increasing the number of inspection units 11 when there is available capacity for an operation (e.g., transferring substrates) of the loader 40.

The plurality of inspection units 11 are arranged in the height direction (the Z-axis direction) and in the horizontal direction (the X-axis direction) perpendicular to the height direction, thereby forming the tower 10. The inspection system 1 includes the loader 40 disposed adjacent to the tower 10 in the horizontal direction, and the loader 40 can selectively transfer the substrates (wafers W) to the inspection units 11 arranged in the height direction. Due to this loader 40, the inspection system 1 can transfer the wafers W to the height of the desired inspection unit 11 among the plurality of inspection units 11.

In the tower 10, the transfer part 13 that connects/communicates with the inspection units 11 arranged in the horizontal direction (the X-axis direction), and the transfer device (the arm transfer device 15) capable of moving in the transfer part 13 are provided for each of the inspection units 11 arranged in the height direction (the Z-axis direction). Hence, in the inspection system 1, the substrate (the wafer W) transferred to a desired height by the loader 40 can be stably transferred in the horizontal direction to the target inspection unit 11.

The first frame (the outer frame 51) includes the tester space 51a accommodating the tester 20, the transfer space 51b forming the transfer part 13, and the second frame space (the inner frame space 51c) accommodating the second frame (the inner frame 52). Accordingly, in the inspection system 1, the functions such as the holding of the tester 20, the transfer of the substrate (the wafer W), and the positioning of the substrate, and the like can be appropriately divided in each inspection unit 11.

Further, the second frame space (the inner frame space 51c) and the transfer space 51b are arranged side by side under the tester space 51a, and the second frame (the inner frame 52) can be extracted from the second frame space in a direction away from the transfer space 51b. Accordingly, in the inspection system 1, the second frame can be smoothly extracted with respect to the first frame (the outer frame 51).

The tester 20 has the tester-side interface (the pogo frame 22) that projects from the tester space 51a toward the second frame space (the inner frame space 51c) and can be brought into contact with the substrate (the wafer W) transferred by the moving part 30. The first frame (the outer frame 51) has the tester moving mechanism 57 capable of moving the tester 20 in the height direction. The tester-side interface is disposed in the tester space 51a by the movement of the tester 20. Accordingly, in the inspection system 1, the second frame (the inner frame 52) can be smoothly extracted without disturbing the tester-side interface.

The tester 20 can be extracted from the first frame (the outer frame 51) in a state where the tester-side interface (the pogo frame 22) is disposed in the tester space 51a. Accordingly, the inspection system 1 can improve the efficiency of the maintenance of the tester 20.

The loader 40 includes the transfer robot 43 for transferring the substrate (the wafer W) therein, and the elevator 45 that can be raised and lowered in the height direction and receives and delivers the substrate from and to the transfer robot 43. Accordingly, in the inspection system 1, the substrate can be simply moved to a desired height.

The second frame (the inner frame 52) includes the optical device 58 for measuring the position of the substrate (the wafer W) placed on the moving part 30. Accordingly, the inspection system 1 can easily obtain the information on the position of the substrate with respect to the tester 20 for each inspection unit 11. Since the optical device 58 can also be extracted when the second frame is extracted, a user can easily perform the maintenance of the optical device 58.

The moving part 30 includes the placing table 33 on which the substrate (the wafer W) is placed, and the moving mechanism 31 for moving the placing table 33 in at least three-dimensional directions. Accordingly, each inspection unit 11 can stably bring the substrate on the placing table 33 into contact with the tester 20.

The inspection system 1 according to the embodiment of the present disclosure is illustrative in all respects and are not restrictive. The above-described embodiment may be changed or modified in various forms without departing from the scope of the appended claims and the gist thereof. The above-described embodiment may include other configurations without contradicting each other and may be combined without contradicting each other.

The invention claimed is:

1. An inspection system including multiple inspection units configured to inspect substrates,
   wherein each of the inspection units includes:
   a tester configured to inspect a substrate;
   a moving part configured to hold and move the substrate relative to the tester; and
   a frame structure configured to accommodate the tester and the moving part,
   wherein the frame structure of one inspection unit includes:
   a first frame to be connected to a frame structure of another inspection unit; and
   a second frame that accommodates at least the moving part and is configured to move relative to the first frame to extract the moving part from the first frame,
   wherein the first frame has a tester space accommodating the tester and a second frame space accommodating the second frame,
   wherein the tester has a tester-side interface that projects from the tester space toward the second frame space and is brought into contact with the substrate transferred by the moving part, and
   the first frame has a tester moving mechanism configured to move the tester in a height direction, and the tester-side interface is disposed in the tester space by the movement of the tester.

2. The inspection system of claim 1, wherein the plurality of inspection units are arranged in the height direction and in a horizontal direction perpendicular to the height direction to form a tower,
   the inspection system includes a loader disposed adjacent to the tower in the lateral direction, and
   the loader selectively transfers the substrate to each of the inspection units arranged in the height direction.

3. The inspection system of claim 2, wherein in the tower, a transfer part to communicate with the inspection units arranged in the horizontal direction and a transfer device configured to move in the transfer part are provided for each of the inspection units arranged in the height direction.

4. The inspection system of claim 3, wherein the first frame has a transfer space forming the transfer part.

5. The inspection system of claim 4, wherein the second frame space and the transfer space are arranged side by side under the tester space, and the second frame is extracted from the second frame space in a direction away from the transfer space.

6. The inspection system of claim 1, wherein the tester is extracted from the first frame in a state where the tester-side interface is disposed in the tester space.

7. The inspection system of claim 2, wherein the loader includes a transfer robot configured to transfer the substrate in the loader, and an elevator that is raised and lowered in the height direction and receives and delivers the substrate from and to the transfer robot.

8. The inspection system of claim 1, wherein the second frame includes an optical device configured to measure a position of the substrate placed on the moving part.

9. The inspection system of claim 1, wherein the moving part includes a placing table on which the substrate is placed, and a moving mechanism configured to move the placing table in at least three-dimensional directions.

\* \* \* \* \*